(12) United States Patent
Lim et al.

(10) Patent No.: US 7,801,075 B2
(45) Date of Patent: Sep. 21, 2010

(54) METHOD OF ALLOCATING RESOURCE IN BASE STATION

(75) Inventors: Kwang-Jae Lim, Daejeon (KR); Chul-Sik Yoon, Seoul (KR)

(73) Assignees: Samsung Electronics Co., Ltd. (KR); Electronics and Telecommunications Research Institute; KT Corporation; SK Telecom Co., Ltd.; Hanara Telecom, Inc.

( * ) Notice: Subject to any disclaimer, the term of this patent is extended or adjusted under 35 U.S.C. 154(b) by 960 days.

(21) Appl. No.: 11/599,809

(22) Filed: Nov. 15, 2006

(65) Prior Publication Data
US 2008/0037464 A1 Feb. 14, 2008

(30) Foreign Application Priority Data
Nov. 16, 2005 (KR) .................... 10-2005-0109614

(51) Int. Cl.
*H04W 4/00* (2009.01)
*H04W 72/00* (2009.01)

(52) U.S. Cl. .................. 370/329; 370/332; 370/334; 370/335; 455/450; 455/452.2; 455/63.4

(58) Field of Classification Search .................. 370/329, 370/333, 334
See application file for complete search history.

(56) References Cited

U.S. PATENT DOCUMENTS

| 6,337,853 B1 | 1/2002 | Piolini |
| 6,463,295 B1 | 10/2002 | Yun |
| 6,870,808 B1 | 3/2005 | Liu et al. |

OTHER PUBLICATIONS

Martin Schubert et al., Solution of the Multiuser Downlink Beamforming Problem with Individual SINR Constraints, IEEE Transactions on Vehicular Technology, vol. 53, No., Jan. 2004.

*Primary Examiner*—Nick Corsaro
*Assistant Examiner*—Huy C Ho
(74) *Attorney, Agent, or Firm*—The Farrell Law Firm, LLP

(57) ABSTRACT

A base station using multiple antennas receives channel quality information from a terminal so as to allocate uplink/downlink resources to the terminal. Herein, the channel quality information is measured on the basis of a downlink preamble or pilot signal, and may include a received CINR or received signal strength. In addition, the base station predicts a received SINR by using a channel response and channel quality information between the multiple antennas and the terminal, and allocates a resource to the terminal according to the received SINR.

22 Claims, 5 Drawing Sheets

METHOD OF ALLOCATING RESOURCE IN BASE STATION

PRIORITY

This application claims priority under 35 U.S.C. §119 to a Korean application filed in the Korean Intellectual Property office on Nov. 16, 2005 and allocated Serial No. 10-2005-0109614, the contents of which are incorporated herein by reference.

BACKGROUND OF THE INVENTION (a) Field of the Invention

The present invention relates to a resource allocation method of a base station. More particularly, it relates to a downlink/uplink scheduling and resource allocation method of a base station using space division multiplexing (SDM) with multiple antennas.

(b) Description of the Related Art

In a communication system, for example in an IEEE 802.16-based orthogonal frequency division multiplexing access (OFDMA) communication system, a base station may use multiple antennas and a terminal may use one or more antennas. In this case, the same radio resource that is defined by frequency and time can be allocated to a plurality of terminals. When the same radio resource is allocated to the plurality of terminals for data communication, the base station spatially divides the plurality of terminals by applying a proper antenna weight to each of the respective antennas so as to transmit/receive a signal with the plurality of terminals.

Spectrum efficiency can be improved by applying space division multiple access (SDMA) to the communication system, and therefore the base station performs scheduling and resource allocation through a process that requires a lot of calculation and time.

Particularly, the base station acquires radio channel information between the base station and a terminal to be served. Subsequently, the base station searches for a group of terminals that use the same radio resources and can be spatially divided, and at the same time, the base station selects an optimal radio resource and an optimal amount of radio resources that can be used by the group. In addition, the base station selects a proper modulation and coding scheme (MCS) for each terminal. Since the base station allocates radio resources through the above-described process, it is difficult to apply the SDMA when the length of a transmission frame is as short as 5 ms. In addition, service priority of each terminal must be considered when allocating the radio resources.

Further, the base station must allocate radio resources before a substantially allocated packet is transmitted, and therefore the base station cannot know a signal to interference-and-noise ratio (SINR) when the substantial packet is received. Therefore, the base station cannot determine a proper MCS for each service.

SUMMARY OF THE INVENTION

According to one exemplary embodiment of the present invention, a scheduling and resource allocation method having advantages of allocating a proper modulation and coding scheme by predicting a signal to interference and noise ratio is provided.

According to one exemplary embodiment of the present invention, a resource allocation method of a base station using multiple antennas is provided. The method includes receiving channel quality information measured on the basis of a downlink preamble or pilot signal from a terminal, predicting a received signal to interference and noise ratio (SINR) by using a channel response between the multiple antennas and the terminal and the channel quality information, and allocating resource to the terminal according to the received SINR.

The channel quality information may include a carrier to interference and noise ratio (CINR) and a received signal strength (RSS).

The resource may be a downlink resource, and the received SINR may be downlink-received SINR. The resource may be an uplink resource, and the received SINR may be an uplink-received SINR.

A weight for each of the multiple antennas is determined by using the channel response, and the received SINR is predicted by using the weight and the channel quality information.

In this case, in order to allocate resources to the terminal, an allocation priority for a service of the terminal may be determined, a packet may be selected, and existence of an available resource may be determined. When the available resource exists, an antenna weight of each of the multiple antennas may be calculated by using a first method and the resource may be allocated by using an SDMA allocation method. In addition, when no available resource exists, the antenna weight of each of the multiple antennas may be calculated by using a second method that is different from the first method, and the resource may be allocated by using a non-SDMA allocation method.

When the resource is a downlink resource, the first method may be a maximum ratio transmission (MRT) method and the second method may be a zero forcing (ZF) method.

When the resource is an uplink resource, the first method may be a maximal ratio combining (MRC) method and the second method may be a minimum mean square error (MMSE) method.

According to another exemplary embodiment of the present invention, a recording medium in which a program for realizing a downlink resource allocation method is written is provided by the base station The downlink resource allocation method includes receiving channel quality information that is estimated on the basis of a downlink preamble or pilot signal from a terminal, determining an antenna weight of each of the respective multiple antennas by using a channel response between the respective multiple antennas and the terminal, predicting a downlink received signal to interference and noise ratio (SINR) by using the antenna weight and the channel quality information, and selecting a modulation and coding scheme (MCS) level according to the antenna weight and the received SINR and allocating downlink resources to the terminal.

According to another exemplary embodiment of the present invention, a recording medium in which a base station writes a program for realizing an uplink resource allocation method is provided. The uplink resource allocation method includes receiving channel quality information that is estimated on the basis of an downlink preamble or pilot signal from the terminal, determining an antenna weight of each of the respective multiple antennas by using a channel response between the respective multiple antennas and the terminal, predicting an uplink received signal to interference and noise ratio (SINR) by using the antenna weight and the channel quality information, and selecting a modulation and coding scheme (MCS) level according to the antenna weight and the received SINR and allocating an uplink resource to the terminal.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Further, throughout this specification and the claims that follow, a module is defined as a unit that performs a specific function or operation, and can be realized by hardware or software, or a combination of both.

A scheduling and resource allocation method of a base station in a communication system according to an exemplary embodiment of the present invention will now be described in further detail. The exemplary embodiment of the present invention is exemplarily applied to an IEEE 802.16 OFDMA communication system, and the exemplary embodiment of the present invention can be applied to other communication systems.

A method for calculating an antenna weight and a method for predicting a signal to interference and noise ratio (SINR) in a communication system according to an exemplary embodiment of the present invention will now be described with reference to FIG. 1.

Figure 1:
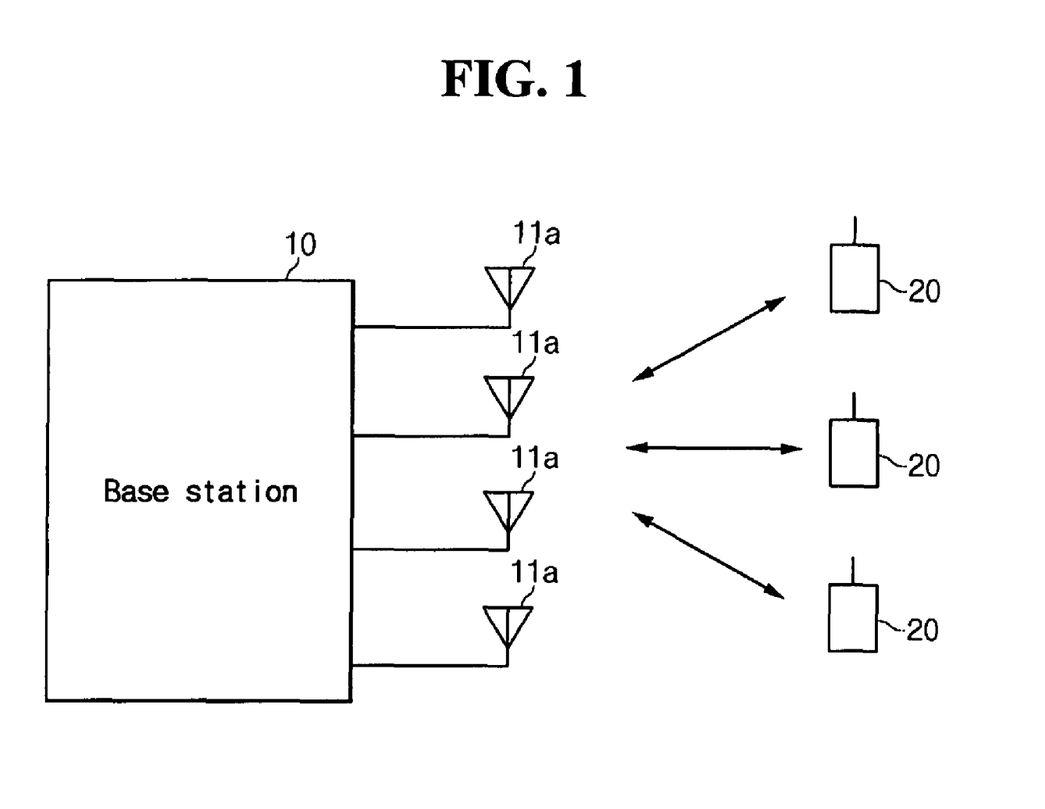
FIG. 1 is a conceptual view of space division multiple access (SDMA) for transmission/receiving signals between a conventional base station using multiple antennas and a plurality of mobile terminals.

FIG. 1 is a schematic view of a communication system according to an exemplary embodiment of the present invention.

As shown in FIG. 1, the communication system according to the exemplary embodiment of the present invention includes a base station 10 and a plurality of terminals 20. The base station 10 includes a plurality of antennas 11a, 11b, 11c, and 11d for space division multiple access (SDMA) allocation, and the terminal 10 includes at least one antenna. FIG. 1 shows four antennas of the base station 10 for convenience of description.

Channel Estimation and Report

The base station 10 using the plurality of antennas needs information on channel response and channel quality with the corresponding service terminal 20. The information can be obtained by the following method.

The terminal 20 estimates channel quality information from a preamble or pilot signal of a frame transmitted from the base station 10, and reports the estimated channel quality information to the base station 10. The channel quality information includes a carrier to interference and noise ratio (CINR) and a received signal strength (RSS).

In more detail, the terminal 20 estimates a received CINR from the preamble or pilot signal of the frame transmitted from the base station 10 and reports the estimated CINR information to the base station 10 through an uplink channel. The base station 10 can acquire channel quality and CINR information from the CINR information reported from the base station 10. In addition, the terminal 20 also estimates an RSS of the base station 10 and reports the estimated RSS to the base station 10. The base station 10 already knows transmission power used for transmitting the preamble or pilot signal, and therefore the base station 10 can acquire a transmission path gain including an antenna gain between the base station 10 and the corresponding terminal 20 from the RSS of the base station 10 reported from the terminal 20. In addition, the base station 10 estimates noise and interference (NI) transmitted to the base station 10 through the uplink channel.

In order to transmit/receive data by using multiple antennas with a high CINR, the base station 10 estimates a channel response between each antenna 11a to 11d and the terminal 20. According to an exemplary embodiment of the present invention, the terminal 20 estimates an antenna-specific pilot signal, estimates a channel response, and periodically reports the estimated channel response to the base station 10 through the uplink channel for the channel response estimation. This method requires antenna-specific pilot allocation.

According to another exemplary embodiment of the present invention, the base station 10 determines a specific pattern (e.g., a sounding signal) among predetermined signal patterns such as a preamble or pilot signal, a subcarrier, and a time symbol location for a terminal 20, and reports the determined information to each of the terminals 20 for the channel response estimation. Each terminal 20 transmits the sounding signal determined by the base station 10 through the uplink channel. The base station 10 estimates a signal received from the terminal 20 through the uplink channel and estimates a channel response between the terminal and the respective antennas 11a to 11d of the base station 10.

Other methods can be used for the channel response estimation according to another embodiment of the present invention, and it is assumed that the base station 10 acquires information on a corresponding terminal 20 by using the above-described method or another method in the following description.

Downlink Received Signal Model

When the base station 10 simultaneously transmits data signals to M terminals 20 through N antennas 11a to 11d, a received signal model in a specific subcarrier and a specific time symbol can be obtained as given in Equation 1 (where N and M are natural numbers that are greater than 1).

$$y = HWs + n \quad \text{[Equation 1]}$$

$$\begin{pmatrix} y_1 \\ y_2 \\ \vdots \\ y_M \end{pmatrix} = \begin{pmatrix} h_{11} & h_{12} & \cdots & h_{1N} \\ h_{21} & h_{22} & \cdots & h_{2N} \\ \vdots & \vdots & \ddots & \vdots \\ h_{M1} & h_{M1} & \cdots & h_{MN} \end{pmatrix}$$

-continued $$\begin{pmatrix} w_{11} & w_{12} & \cdots & w_{1M} \\ w_{21} & w_{22} & \cdots & w_{2M} \\ \vdots & \vdots & \ddots & \vdots \\ w_{N1} & w_{N1} & \cdots & w_{NM} \end{pmatrix} \begin{pmatrix} s_1 \\ s_2 \\ \vdots \\ s_M \end{pmatrix} + \begin{pmatrix} n_1 \\ n_2 \\ \vdots \\ n_M \end{pmatrix}$$

In Equation 1, $y_i$ denotes a received signal of a terminal i (i=1, 2, ..., M), hij denotes a channel between a base station antenna j (=1, 2, ..., N) and the terminal i, $w_{ji}$ denotes an antenna weight of the base station antenna j for the terminal i, $s_i$ denotes a data symbol transmitted to the terminal i, and $n_j$ denotes an interference from other base stations and noise signal received by the terminal i For the received signal represented as given in Equation 1, a received signal to interference and noise ratio (SINR) $\gamma_k$ of a specific terminal k for a data signal can be obtained as given in Equation 2.

$$\gamma_k = \frac{E_k(w_k^H h_k^H h_k w_k)}{\sum_{m \neq k} E_m(w_m^H h_k^H h_k w_m) + N_k}$$ [Equation 2]

In Equation 2, $E_k$ denotes data symbol energy transmitted to a terminal k, $N_k$ denotes interference and noise power density of another base station received by the terminal k, $h_k$ denotes a channel response vector (i.e., 1×N vector) for the terminal k, and $w_k$ denotes an antenna weight vector (i.e., N×1 vector) for the terminal k.

Downlink Antenna Weight

In the above-described signal model, the base station transmits data by applying a proper antenna weight to the respective terminals so that a signal to interference and noise ratio (SINR) of the terminal 20 can be increased. Therefore, a channel response between the terminal 20 and each antenna 11a to 11d is required, and this can be obtained through the above-described channel estimation and report process. According to an exemplary embodiment, the base station 10 may obtain an antenna weight for each terminal by using a maximum ratio transmission (MRT) method as given in Equation 3 and a zero forcing (ZF) method as given in Equation 4.

$$w_k = \frac{h_k^H}{\sqrt{\|h_k\|_F^2}}$$ [Equation 3]

$$w_k = \frac{h_k^{(+)}}{\sqrt{\|h_k^{(+)}\|_F^2}}$$ [Equation 4]

In the above equations, $w_k$ denotes an antenna weight vector for the terminal k, $h_k$ denotes a k-th column vector of a matrix H, $h_k^{(+)}$ denotes a k-th column vector of a pseudo inverse matrix of the matrix H, and $\|.\|_F^2$ denotes a Frobenius norm.

The MRT method is used to obtain an antenna weight without considering interference of a transmission signal to another terminal that uses the same radio resource, and the ZF method is used to obtain an antenna weight without causing interference between signals of terminals using the same radio resource. Therefore, when the amount of available radio resources is sufficient so that SDMA allocation is not required, the MRT method can be used to increase a received SINR of the corresponding terminal 20 by beam-forming. When the amount of available radio resources is insufficient so that the SDMA allocation is required, the ZF method can be used to spatially reuse radio resources.

The antenna weight can be differently calculated for each subcarrier, and adjacent subcarriers on the frequency axis can be grouped so as to reduce a calculation amount. In this case, the same antenna weight can be applied to subcarriers in a group.

Downlink Received SINR Prediction

The base station 10 applies the antenna weight calculated through Equation 3 or Equation 4 when transmitting a service packet to the corresponding terminal 20. In this case, the base station 10 may determine a modulation and coding scheme (MCS) of the packet. Therefore, the base station 10 can estimate an SINR of a packet received by the terminal 20 when the packet is transmitted with the antenna weight obtained through Equation 5.

$$\gamma_k = \frac{E_k \left| \sum_{n=1}^{N} h_{kn} w_{nk} \right|^2}{\sum_{m=0, m \neq k}^{M} E_m \left| \sum_{n=1}^{N} h_{kn} w_{nk} \right|^2 + N_k}$$ [Equation 5]

$$= \frac{E_k G_k^2 \left| \sum_{n=1}^{N} h'_{kn} w_{nk} \right|^2}{G_k^2 \sum_{m=0, m \neq k}^{M} E_m \left| \sum_{n=1}^{N} h'_{kn} w_{nm} \right|^2 + N_k}$$

In Equation 5, $\hat{\gamma}_k$ is an SINR of the terminal k, $h_{kn}=h_{kn}'G_k$ denotes a channel response between the terminal k and an antenna n, $G_k$ denotes a transmission path gain, $h_k'$ denotes a normalized channel response between the terminal k and the antenna n, $E_k$ denotes data symbol energy transmitted to the terminal k, and $N_k$ denotes interference and noise power density received by the terminal k.

The normalized channel response $h_{kn}'$ implies that the channel response is normalized through Equation 5 so as to make a sum of channel response power of all antennas correspond to 1, and the base station 10 can know an antenna-specific channel response by using the above-described channel estimation and report process. Transmission power $E_k$ of each terminal 20 is determined through an allocation process of the base station 10. The base station 10 calculates the transmission path gain for the terminal 20 and an interference from other base stations and noise power density $N_k$ through Equation 6 and Equation 7 by using values reported from the terminal 20, respectively.

$$G_k^2 = P_{rx,k}/P_{tx}$$ [Equation 6]

In Equation 6, $P_{rx,k}$ denotes received preamble or pilot signal energy reported from the terminal k, and $P_{tx}$ denotes transmitted preamble or pilot signal power of the base station 10.

$$N_k = P_{tx} G_k^2 / CINR_k$$ [Equation 7]

In Equation 7, $CINR_k$ denotes a received preamble or pilot CINR reported from the terminal k.

Substantially, in the case of using the MRT method with non-SDMA allocation, the same radio resource is not applied to multiple terminals, and therefore an interference term that is the first term of a denominator of Equation 5 has a value of 0. In addition, in the case of using the ZF method with the SDMA allocation, the antenna weight is obtained without causing interference, and therefore the interference term must be considered as in the case of using the MRT method. Therefore, Equation 5 can be represented without using the interference term as given in Equation 8.

$$\hat{\gamma}_k = \frac{E_k \left|\sum_{n=1}^{N} h_{kn} w_{nk}\right|^2}{N_k} = \frac{E_k G_k^2 \left|\sum_{n=1}^{N} h'_{kn} w_{nk}\right|^2}{N_k} \quad \text{[Equation 8]}$$

Transmission power $E_{req,k}$ that satisfies an SINR required for a specific-MCS level for the terminal k from Equation 8 can be calculated as given in Equation 9.

$$E_{req,k} = \frac{N_k \gamma_{req}(MCS_x)}{\left|\sum_{n=1}^{N} h'_{kn} w_{nk}\right|^2 G_k^2} \quad \text{[Equation 9]}$$

In Equation 9, $\gamma_{req}(MCS_x)$ denotes a required SINR for the specific MCS level $MCS_x$.

Downlink Allocation Process

A downlink scheduling and allocation process according to the exemplary embodiment of the present invention will be described with reference to FIG. 2 and FIG. 3. The above-described antenna weight calculation method and the received SINR estimation method will be applied to the downlink scheduling and allocation process. A priority determining method and a method for determining the amount of radio resource allocation that can be determined by a service packet and an MCS level are well known to a person skilled in the art, and therefore further descriptions will be omitted.

Figure 2:
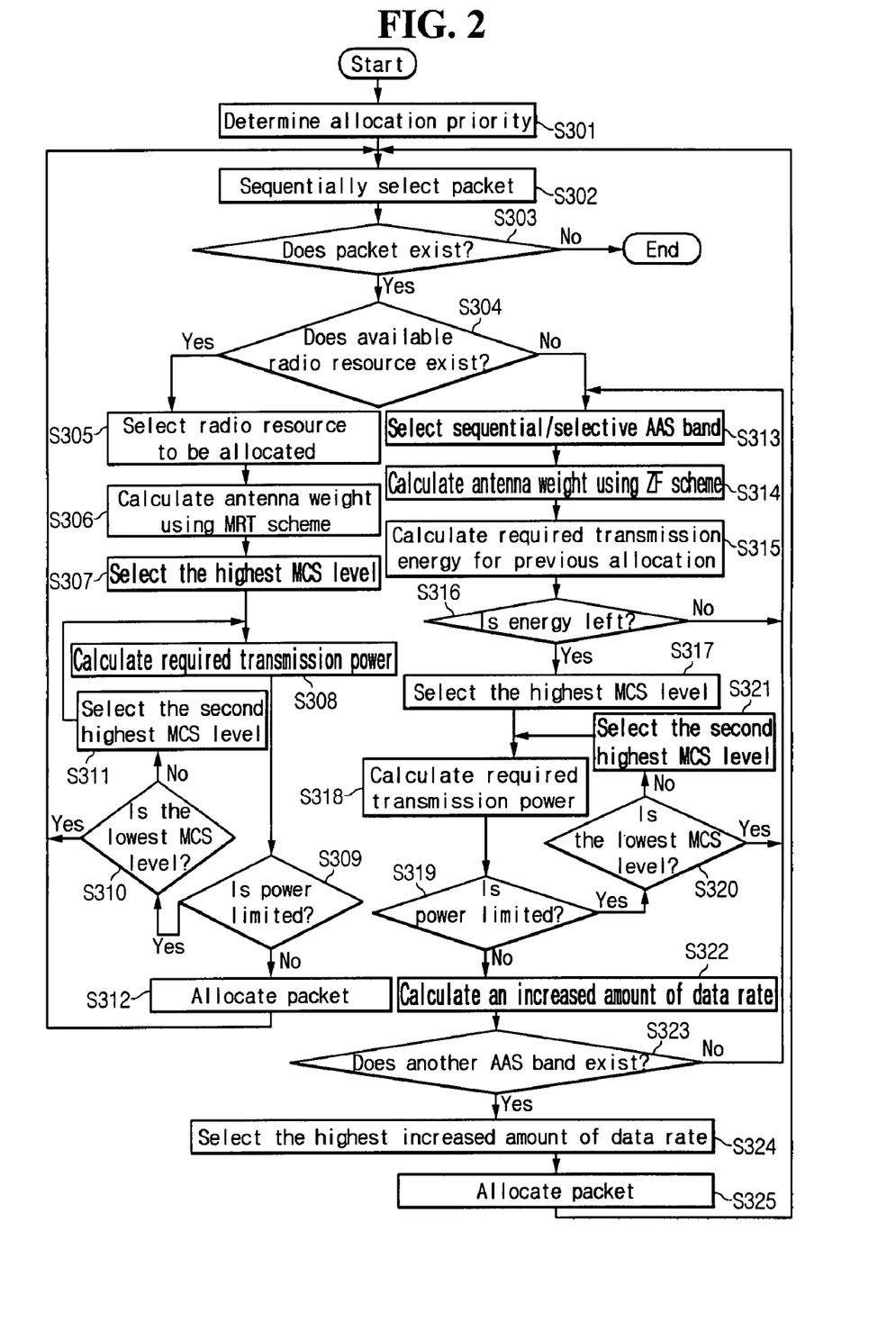
FIG. 2 is a schematic flowchart of a downlink radio resource allocation process of a base station according to the exemplary embodiment of the present invention.
Figure 3:
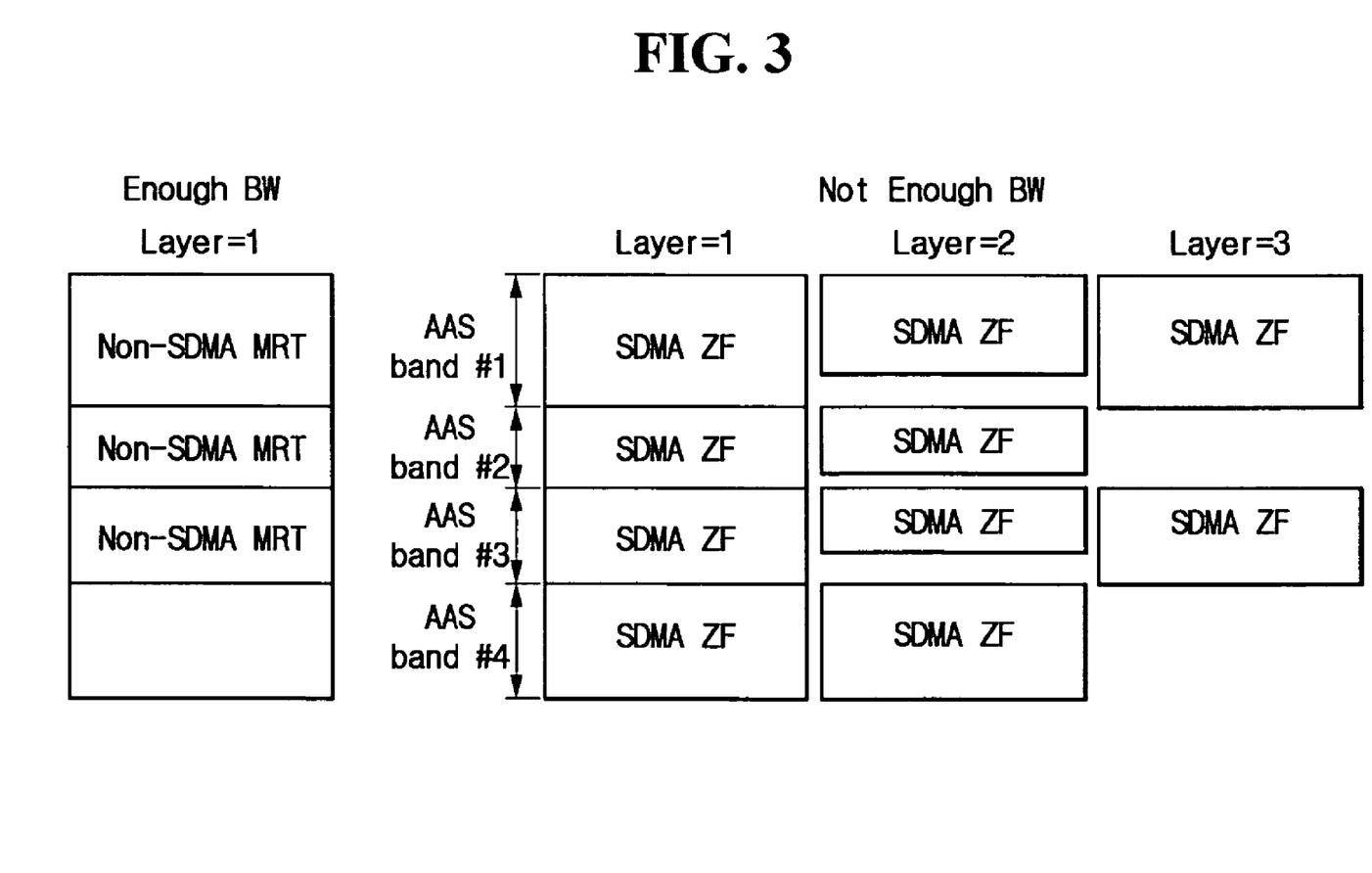
FIG. 3 schematically shows non-SDMA allocation in the case that the amount of radio resources is sufficient and SDMA allocation in the case that the amount of radio resources is insufficient in downlink radio resource allocation.

FIG. 2 is a flowchart of a downlink radio resource allocation process of the base station 10 according to the exemplary embodiment of the present invention, and FIG. 3 shows a non-SDMA allocation process in the case that the amount of radio resources is sufficient and an SDMA allocation process in the case that the amount of radio resource is insufficient.

The base station 10 determines an allocation priority for a service of each terminal 20 according to a predetermined priority determination method in step S301, and sequentially selects packets in step S302. Subsequently, the base station 10 repeats the following radio resource allocation processes until there are no service packets to be allocated.

In further detail, the base station 10 checks a packet to be allocated in step S303, and terminates the radio resource allocation process when there are no service packets to be allocated. When there is a service packet to be allocated, the base station 10 determines whether available radio resources exist, in step S304.

When the available radio resources exist, the base station 10 selects a radio resource to be allocated in step S305, and calculates an antenna weight by using an antenna-specific channel response for a terminal to be allocated with the radio resource based on the MRT method, in step S306. Then, the base station 10 selects the highest MCS level having a high data rate in step S307, and calculates required transmission power that satisfies a required SINR of the selected MCS level in step S308.

The base station 10 determines whether the calculated required transmission power exceeds the maximum transmission power range (i.e., limited power range) in step S309. When the required transmission power is included within the limited power range, the base station 10 determines whether the selected MCS level is the lowest MCS level, in step S310. When the selected MCS level is not the lowest MCS level, the base station 10 selects the second highest MCS level in step S311 and repeats the above-stated processes from step S308. When the selected MCS level is the lowest MCS level, the base station 10 selects a service packet in step S302 and repeats the above-stated processes from step S302.

When the required transmission power is not included within the limited power range, that is, when the required transmission power does not exceed the maximum transmission power, the base station 10 allocates a service packet to the corresponding terminal 20 by using the selected MCS level and the calculated antenna weight in step S312, selects a packet in step S302, and repeats the above-stated processes from step S302.

When it is determined in step S304 that there are no available radio resources left, the base station 10 selects a sequential/selective adaptive antenna system (AAS) in step S313, and calculates an antenna weight for each of terminals 20 that have already been allocated with radio resources in the same allocation band, including a terminal 20 to be allocated with a radio resource by using the ZF method, in step S314.

The base station 10 calculates required transmission energy for the terminals that have already been allocated the radio resources in the same allocation band in step S315, and determines whether available radio resources are left, in step S316. When available radio resources are left, the base station 10 selects the highest MCS level that can be supported by using the available radio resource for a terminal to be additionally allocated in step S317, and calculates required transmission energy in step S318.

Subsequently, the base station 10 determines whether the required transmission energy is included within the limited energy range in step S319, and calculates an increased amount of data transmission rate due to the additional allocation when the required transmission energy does not exceed the maximum transmission energy in step S322. When there are no available radio resources left in step S316, the base station 10 sets the increased amount of data rate to zero.

When it is determined in step S319 that the required transmission power is included within the limited power range, the base station 10 determines whether the selected MCS level is the lowest MCS level in step S320, and selects the second highest MCS level when the lowest MCS level is not selected in step S321. After that, the base station 10 repeats the above-stated processes from step S318.

After calculating the increased amount of data rate due to the additional allocation, the base station 10 determines whether another allocation band (i.e., another AAS band) exists, in step S323. When another AAS band exists, the base station 10 selects an AAS band having the highest data rate in step S324, and repeats the above-stated processes from step S302.

That is, when an increased amount of a data rate not calculated for all allocation bands, the base station 10 attempts allocation for the other allocation band (i.e., the other AAS band) from step S313. When an increased amount of data rate of every allocation band is calculated, the base station 10 allocates a service packet to a terminal in an allocation band having the highest data rate, and attempts radio resource allocation to another terminal from step S301. The base station 10 repeats the above-stated processes until there are no terminals to which additional allocation can be attempted.

As described, according to the exemplary embodiment of the present invention, when available radio resources (bandwidths) exist, the same radio resource is not allocated to multiple terminals (i.e., non-SDMA allocation) and an antenna weight is determined by using the MRT method as shown in FIG. 3. A radio resource is allocated to a specific band when a received SINR of the specific band is high and thus selective reporting is required. When there is no need for reporting a specific band, a radio resource is sequentially allocated to bands.

The size of a radio resource to be allocated is determined by the size of a service packet and an MCS to be used for transmission of the service packet. Each radio resource may have a difference channel response and a different antenna weight according to an allocated location, and therefore each radio resource may have a different SINR prediction value. Therefore, the base station 10 determines an MCS level by using an average value of received SINRs, respectively predicted for radio resources to be allocated. That is, the base station 10 acquires required transmission power of each radio resource to be allocated by using Equation 9, and calculates average transmission power for all radio resources. In addition, the base station 10 selects an MCS level having the highest data rate within a range that does not exceed the maximum transmission power.

When no available radio resources exist, the SDMA allocation process is performed by using the same radio resource for at least one terminal as shown in FIG. 3, and, in this case, an antenna weight can be determined by using the ZF method as given in Equation 4. In this case, a radio resource is already being used for packet transmission of other terminals, and an additionally allocated packet is set to use the same radio resource as of previously allocated packets and can be spatially divided.

In order to reduce complexity in the radio resource allocation process, the additionally allocated packet is set to be included within a radio resource area (i.e., AAS band) of a packet that has been allocated through the non-SDMA allocation process. That is, as shown in FIG. 3, an additional SDMA allocation process on the radio resources is performed within an AAS band that has been already divided as a radio resource area allocated by the non-SDMA process.

In the case of the SDMA allocation, the additional allocation of a packet that uses the same radio resource can affect transmission power and a received SINR of a previously allocated packet and a received SINR of the corresponding packet. Since resource allocation is sequentially performed in accordance with a scheduling priority, the previously allocated packet has a higher priority than the additionally allocated packet. Therefore, in order to guarantee quality of service (QoS), a packet having a lower priority can be additionally allocated as long as the additional allocation does not affect the data rate, transmission power, and radio resources in use of the previously allocated packet. In addition, the additional allocation with consideration of such a priority does not perform reallocation for the previous allocation, and therefore the amount of calculation and time consumed for the allocation process can be reduced.

In the case of the SDMA allocation, a band having the highest data rate is searched among radio resource bands (i.e., AAS bands) that have been divided by the non-SDMA allocation as long as the additional allocation does not affect transmission quality of the previously allocated packet, and additional allocation is performed within the searched band.

In further detail, an AAS band is sequentially selected and the following process is performed on the selected AAS band. That is, an antenna weight of each terminal that uses the same AAS band, including a terminal to be additionally allocated with a radio resource, can be determined by using the ZF method. When the antenna weight is determined by using the ZF method, the SDMA allocation is re-performed for the next AAS band when no antenna weight is determined.

Transmission power required for packet transmission of each terminal can be calculated by using the antenna weight. In this case, a previously allocated terminal uses an MCS level that has been determined in previous allocation, and when a 1) sum of the calculated transmission power is less than a 2) sum of the maximum transmission power of the base station 10, a difference between 1) and 2) can be used as transmission power for the terminal to be additionally allocated with the radio resource. An MCS level for the additional allocation can be determined in accordance with the amount of available transmission power. When no available transmission power is left, additional allocation can be reattempted for the next AAS band.

When the additional allocation can be performed, an increased amount of data rate due to the additional allocation can be calculated in accordance with a size of a service packet, a size of a radio resource in the corresponding AAS band, and the highest MCS level that can be used, and then the above-stated processes can be repeated for the next AAS band. Accordingly, an AAS band having the highest data rate among all AAS bands is selected and the SDMA allocation can be additionally performed. When the additional allocation is performed, an antenna weight calculated for the additional allocation can be applied to previous allocation. Such processes can be repeated until no terminal or packet that has not been additionally allocated is left.

Subsequently, an uplink radio resource allocation process of the base station 10 will be described in further detail with reference to FIG. 4 and FIG. 5.

Uplink Received Signal Model

When the base station 10 receives signals transmitted from M terminals 20 through N multiple antennas 11a to 11d, a received signal model in a specific subcarrier and a specific time symbol can be represented as given in Equation 10. Herein, M and N are natural numbers and are greater than 1.

$$y = Hs + n \qquad \text{[Equation 10]}$$

$$\begin{pmatrix} y_1 \\ y_2 \\ \vdots \\ y_N \end{pmatrix} = \begin{pmatrix} h_{11} & h_{12} & \cdots & h_{1M} \\ h_{21} & h_{22} & \cdots & h_{2M} \\ \vdots & \vdots & \ddots & \vdots \\ h_{N1} & h_{NI} & \cdots & h_{NM} \end{pmatrix} \begin{pmatrix} s_1 \\ s_2 \\ \vdots \\ s_M \end{pmatrix} + \begin{pmatrix} n_1 \\ n_2 \\ \vdots \\ n_N \end{pmatrix}$$

In Equation 10, $y_i$ denotes a received signal of an antenna i of the base station 10, $h_{ij}$ denotes a channel response between the antenna i and a terminal j, $s_j$ denotes a transmit data symbol of the terminal j, and $n_i$ denotes an interference and noise signal in the antenna i. Herein, i is an integer of greater than 1 and less than N, and j is an integer of greater than 1 and less than M.

When combining the received signal represented as given in Equation 10 and an appropriate antenna weight of the respective antennas 11a to 11d of the base station 10, a data symbol transmitted from each of the terminals 20 can be detected as given in Equation 11.

$$z = Wy = W(Hs + n) \quad \text{[Equation 11]}$$

$$\begin{pmatrix} z_1 \\ z_2 \\ \vdots \\ z_M \end{pmatrix} = \begin{pmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M1} & \cdots & w_{MN} \end{pmatrix} \begin{pmatrix} y_1 \\ y_2 \\ \vdots \\ y_N \end{pmatrix}$$

In Equation 11, $z_j$ denotes a data symbol detected for the terminal j and $w_{ji}$ denotes an antenna weight of the antenna j for the terminal i.

A received SINR $\gamma_k$ of a data signal transmitted from a specific terminal k for the detected signal represented as given in Equation 11 can be determined as given in Equation 12.

$$\gamma_k = \frac{E_k (w_k^H h_k^H h_k w_k)}{\sum_{m \neq k} E_m (w_k^H h_m^H h_m w_k) + \sum_n N_n |w_{kn}|^2} \quad \text{[Equation 12]}$$

In Equation 12, $E_k$ denotes transmission symbol power of the terminal k and $N_n$ denotes interference and noise power density of an antenna n of the base station 10.

Uplink Antenna Weight

In the above signal model, the base station 10 receives a signal by applying a proper antenna weight to each of the terminals so that a received SINR of the corresponding terminal can be increased. Therefore, a channel response between each terminal 20 and each antenna 11a to 11d is required. The channel response can be estimated by the previously described channel estimation and report process, or can be estimated by detecting a pilot signal received when each terminal receives a data packet. In the case of uplink, an antenna weight $w_k$ for each terminal 20 can be determined by using the MRC method of Equation 13 and a minimum mean square error (MMSE) method of Equation 14.

$$w_k = h_k^H \quad \text{[Equation 13]}$$

$$w_k = \left( H^H H + \frac{1}{SNR} I_M \right)^{-1} h_k^H \quad \text{[Equation 14]}$$

In Equation 14, SNR denotes a received signal to noise ratio.

The MRC method acquires an antenna weight without considering interference due to signal transmission for another terminal that uses the same radio resource, and the MMSE method acquires an antenna weight without causing interference between signals of other terminals that use the same radio resource. Therefore, the MRC method can be used to increase a received SINR of the corresponding terminal 20 by beam-forming when available radio resources exist and thus the SDMA allocation is not needed, and the MMSE method can be used when spatially reusing radio resources by the SDMA allocation due to an insufficient amount of radio resources.

A different antenna weight can be calculated for each subcarrier, and adjacent subcarriers on the frequency axis can be grouped into one group so as to reduce a calculation amount. Herein, the same antenna weight may be applied to each subcarrier included in the group.

Uplink Received SINR Estimation

In order to receive data packets through the uplink channel from the terminal 20, the base station 10 performs uplink radio resource allocation for each terminal 20 and reports the allocation to the corresponding terminal 20. In the uplink resource allocation process, the base station 10 estimates channel quality and channel response of each terminal 20, and predicts a received SINR at the time that a substantial packet is received so as to determine a proper MCS level. Therefore, the base station 10 acquires channel information for each terminal 20 before the substantial packet is received, and the channel information acquisition is performed through the above-described channel estimation and report process. In addition, the base station 10 can predict a received SINR as given in Equation 15.

$$\hat{\gamma}_k = \frac{E_k G_k^2 \left| \sum_{n=1}^{N} w_{kn} h'_{nk} \right|^2}{\sum_{m \neq k} E_m G_m^2 \left| \sum_{n=1}^{N} w_{kn} h'_{nm} \right|^2 + \sum_{n=1}^{N} N_n |w_{kn}|^2} \quad \text{[Equation 15]}$$

In Equation 15, $\hat{\gamma}_k$ denotes a received SINR of the terminal k, $h_{kn} = h_{kn}' G_k$ denotes a channel response between the terminal k and an antenna n, $G_k$ denotes a size of a transmission path gain for the terminal k, $h_{kn}'$ denotes a normalized channel response between the terminal k and the antenna n, and $N_n$ denotes interference and noise power density of the base station antenna n.

The base station 10 can know a channel response for each antenna by using the above-described channel estimation and report process. Transmission power for each terminal 20 is a value determined by an allocation process of the base station 10. The transmission path gain for the corresponding terminal 20 can be calculated through Equation 6 by using preamble or pilot received power reported from the terminal 20 as in the downlink allocation. The interference and noise power density for each base station antenna can be estimated by the base station 10.

As described, an antenna weight is applied by using the MRC method when the non-SDMA allocation is performed. In this case, there is no interference from other terminals, and therefore the first interference term of the denominator of Equation 15 can be ignored. Therefore, transmission power for satisfying a required SINR of a specific MCS level can be calculated as given in Equation 16.

$$E_{req,k} = \frac{N_n \gamma_{req}(MCS_x)}{\left| \sum_{n=1}^{N} w_{kn} h'_{nk} \right|^2 G_k^2} \quad \text{[Equation 16]}$$

In Equation 16, $E_{req,k}$ denotes transmission power for satisfying a required SINR of a specific MCS level $MCS_x$ for the terminal k, and $\gamma_{req}(MCS_x)$ denotes a required SINR of the specific MCS level $MCS_x$.

However, an antenna weight can be applied by using the MMSE method when the SDMA allocation is performed. In this case, interference from other terminals exists, and therefore the first term of the denominator of Equation 15 cannot be ignored. Therefore, the transmission power for satisfying the SINR required for the specific MCS level can be obtained by repeated calculation as given in Equation 17.

For $r = 1$ to $R_{itr}$ [Equation 17]

$E_k(0) = 0$ for $k = 1, 2, \ldots, M$ $$E_k(r) = \gamma_{req}(MCS_k) \frac{\sum_{m \neq k} E_m(r-1) G_m^2 \left| \sum_{n=1}^{N} h'_{nm} w_{kn} \right|^2 + \sum_{n=1}^{N} N_n |w_{kn}|^2}{\left| \sum_{n=1}^{N} h'_{nk} w_{kn} \right|^2 G_k^2}$$

for $k = 1, 2, \ldots, M$

In Equation 16, $MCS_k$ is an MCS level for the terminal k.

Uplink Allocation Process

An uplink scheduling and allocation process using the above-described antenna weight calculation method and received SINR prediction method according to the exemplary embodiment of the present invention will now be described. Since a priority determination method and a method for determining a size of radio resource allocation that can be determined for a service packet and an MCS level are well known to a person skilled in the art, further descriptions will be omitted.

The base station 10 determines an allocation priority according to a predetermined priority determination method for a service of each terminal 20. In addition, the base station 10 performs the following process until there is no service packet to allocate.

When an available radio resource exists, the base station 10 does not allocate more than one terminal 20 (i.e., non-SDMA allocation is performed), and an antenna weight can be determined by using the MRC method. When a high received SINR of a specific band is reported from the terminal 20, the base station 10 allocates a radio resource by using the specific band, and when no specific band is reported from the terminal 20, the base band 10 performs sequential allocation.

A size of a radio resource to be allocated can be determined by a size of a service packet and an MCS level to be used for packet transmission. A channel response and an antenna weight can be changed according to a location within allocated radio resources, and therefore a different received SINR may be predicted for each radio resource. Therefore, an MCS level is determined by using an average value of predicted SINRs for radio resources to be allocated. That is, the base station 10 acquires required transmission power for each radio resource to be allocated by using Equation 16, and calculates average transmission power for all radio resources. In addition, the base station 10 selects an MCS level having the highest data rate within a range that does not exceed the maximum transmission power of the terminal 20.

When no available radio resource exists, the base station 10 performs the SDMA allocation for at least one terminal 20 using the same radio resource, and an antenna weight can be determined by using the MMSE method as given in Equation 14. In this case, a radio resource is already being used for packet transmission of other terminals, and an additionally allocated packet is set to use the same radio resource as of previously allocated packets and can be spatially divided.

Figure 4:
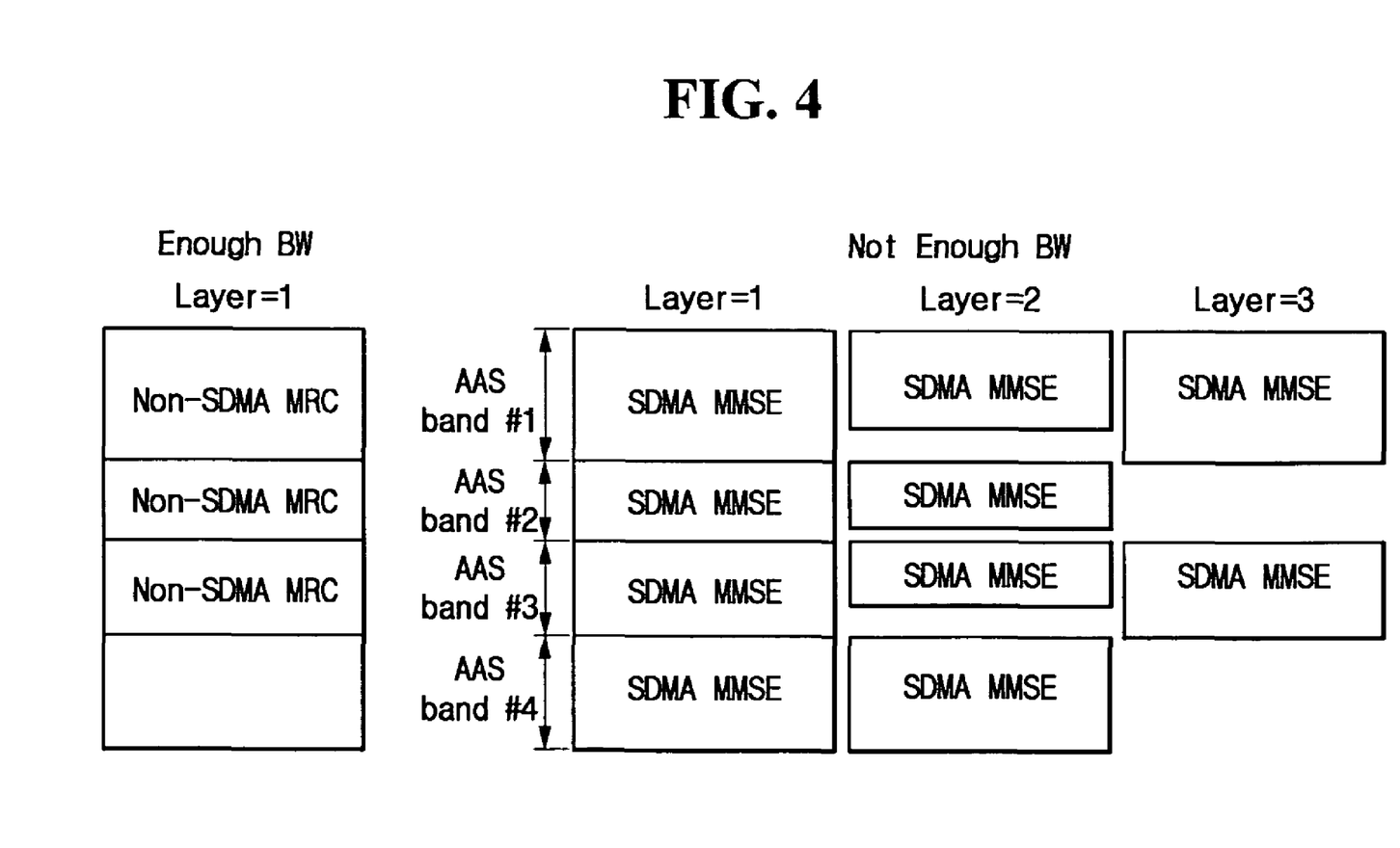
FIG. 4 schematically shows non-SDMA allocation in the case that the amount of radio resources is sufficient and SDMA allocation in the case that the amount of radio resources is insufficient in uplink radio resource allocation.

FIG. 4 shows a non-SDMA allocation process in the case that the amount of radio resources is sufficient and an SDMA allocation process in the case that the amount of radio resources is insufficient in an uplink radio resource allocation process.

In order to reduce complexity in the radio resource allocation process, the additionally allocated packet is set to be included within a radio resource area (i.e., an AAS band) of a packet that has been allocated through the non-SDMA allocation process. That is, as shown in FIG. 4, an SDMA process is performed within an AAS band that has already been divided as a radio resource area allocated by the non-SDMA process.

In the case of the SDMA allocation, a band having the highest data rate is searched among radio resource bands (i.e., AAS bands) that have been divided by the non-SDMA allocation as long as the additional allocation does not affect transmission quality of the previously allocated packet, and additional allocation is performed within the searched band.

The base station 10 sequentially selects an AAS band, and performs the following process for the selected band. The base station 10 obtains an antenna weight by using the MMSE method for all terminals that use the same AAS band, including a terminal to be additionally allocated. When no antenna weight is determined, the SDMA allocation is re-performed for the next AAS band by the base station 10.

Subsequently, the base station 10 calculates transmission power required for packet transmission of each terminal 20 by using the antenna weight. In this case, the previously allocated terminal 20 uses an MCS level determined for the previous allocation. When all required transmission power calculated for all terminals are less than the highest data rate of the terminal 200, additional allocation can be performed. Therefore, for the additional allocation, an MCS level may be sequentially applied to the additional allocation from the highest MCS level when the required transmission power of each terminal 20 does not exceed the maximum transmission power. When transmission power exceeds the maximum transmission power when using the lowest MCS level, the base station 10 reattempts additional allocation for the next AAS band.

When the addition allocation can be performed, the base station 10 calculates a size of a service packet, a size of a radio resource in the corresponding AAS band, and an increased amount of data rate due to the additional allocation, and repeats the above-stated processes for the next AAS band. The base station 10 selects an AAS band having the highest data rate for the additional allocation among all AAS bands and additionally allocates the SDMA allocation. When the additional allocation is performed, an antenna weight calculated for the additional allocation may be applied to an antenna weight for the previous allocation. Such processes are repeated until there is no terminal or packet left to attempt additional allocation.

Figure 5:
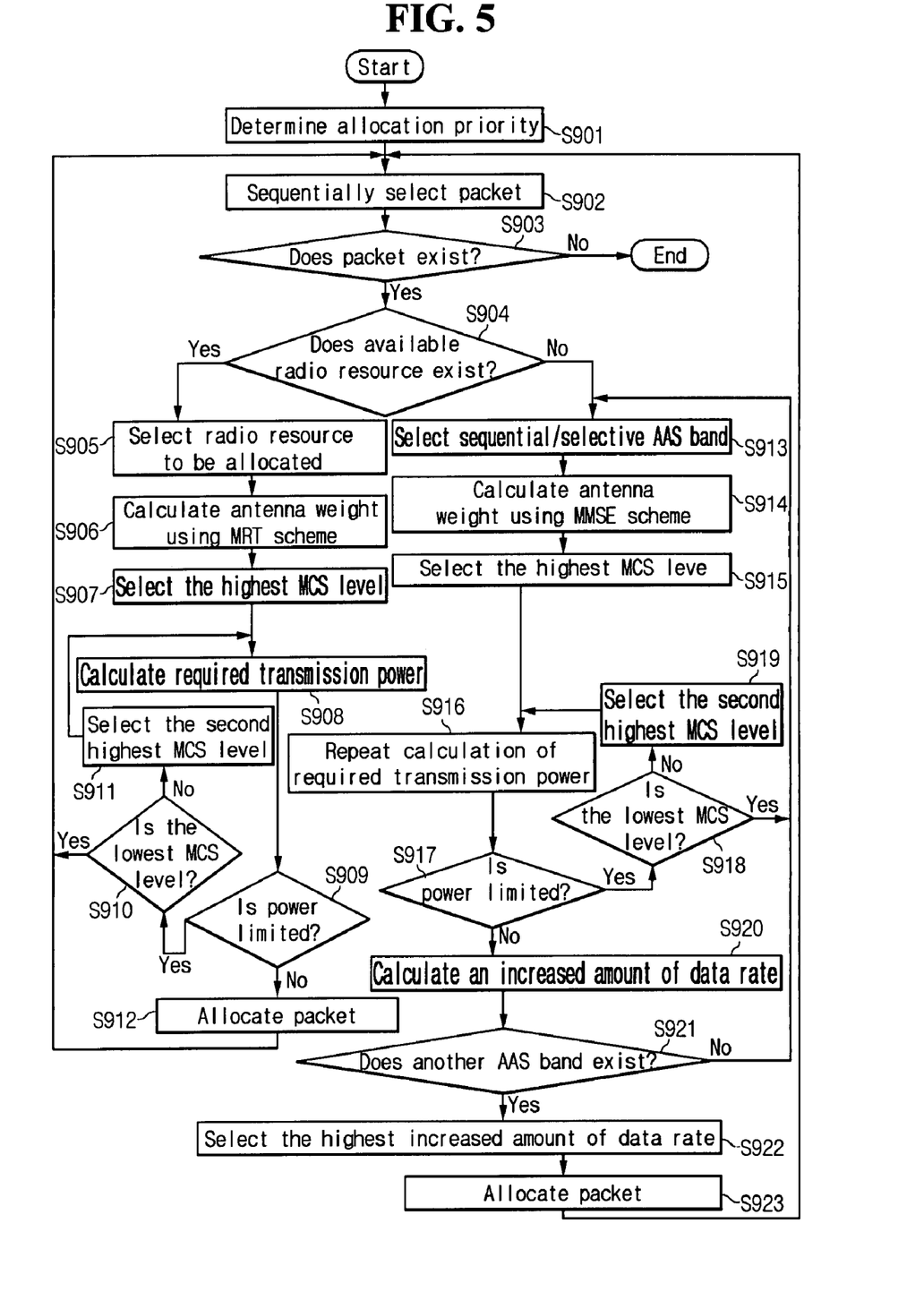
FIG. 5 is a schematic flowchart of an uplink radio resource allocation process of the base station according to the exemplary embodiment of the present invention.

FIG. 5 is a flowchart of an uplink radio resource allocation process of the base station 10 according to the exemplary embodiment of the present invention.

As shown in FIG. 5, the base station 10 determines an allocation priority according to a predetermined priority determination method for a service of each terminal 20, in step S901. The base station 10 sequentially selects packets in step S902, and repeats the radio resource allocation process from step S904 for each service in step S903.

Particularly, the base station 10 determines whether an available radio resource is left, in step S904. When the available radio resource is left, the base station 10 selects an allocated AAS band in step S905, and calculates an antenna weight by using an antenna-specific channel response for a terminal 20 to be allocated, through the MCR method in step S906.

In addition, the base station 10 selects an MCS level having the highest data rate in step S907, and calculates required transmission power for satisfying a required SINR in step S908.

Subsequently, the base station 10 determines whether the required transmission power is included within the limited power range, in step S909. When the required transmission power is included in the limited power range, the base station 10 selects an MCS level having the highest data rate within the limited power range, and determines whether the required transmission power is included within the limited power range, in step S909. When the required transmission power is included within the limited power range, the base station determines whether the selected MCS level is the lowest MCS level in step S910. When the selected MCS level is not the lowest MCS level, the second highest MCS level is selected in step of S911 and repeats from step of S908.

When the required transmission power does not exceed the maximum transmission power, the base station 10 allocates a service packet of the corresponding terminal 20 by using the selected MCS level and the calculated antenna weight, in step S912.

When it is determined in step S904 that no available radio resource exists, the base station 10 sequentially/selectively selects an AAS band in step S913, and calculates antenna weight for previously allocated terminals 20, including a terminal 20 to be allocated, within the AAS band by using the MMSE method in step S914.

Then, the base station 10 selects the highest MCS level for a terminal to be additionally allocated, in step S915, and repeatedly calculates required transmission power, in step S916.

Subsequently, the base station 10 determines whether the required transmission power exceeds the maximum transmission power of the terminal. When the required transmission power exceeds the maximum transmission power, the base station 10 determines whether the selected MCE level is the lowest MCS level in step S918, selects the second highest MCS level when the selected MCS level is not the lowest MCS level in step of S919, and repeats the resource allocation process from step S916.

When required transmission power of the respective terminals 20 in the same AAS band does not exceed the maximum transmission power, the base station 10 selects a maximum MCS level that can be supported for a terminal that is currently to be additionally allocated, and calculates an increased amount of data rate due to the additional allocation, in step S920.

When no required transmission power is less than the maximum power of the terminal 20 for all terminals in the same allocation band with any MCS level for additional allocation, the increased amount of data rate is set to 0.

When an increased amount of data rate is not calculated for all allocation bands, the base station 10 attempts allocation for a remaining allocation band, and when an increased amount of data rate is calculated for all allocation bands, the base station performs substantial allocation to a current additional terminal 20 in an allocation band having the highest increased amount of data rate in step S913 and attempts radio resource allocation to another terminal 20 from step S913.

In addition, the base station 10 determines whether other AAS bands exist after calculating the increased amount of data rate in step S921, and selects an AAS band having the highest data rate among the AAS bands in step S922. Then, the base station 10 allocates a packet to the corresponding terminal 20 in step S923, and attempts radio resource allocation to another terminal 20.

According to the above-described embodiment of the present invention, system capacity can be increased by SDMA resource allocation that reduces the amount of calculations and supports prompt resource allocation without reducing data rate for a high priority service.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resource allocation method of a base station using multiple antennas, the resource allocation method comprising:
    receiving channel quality information measured on the basis of downlink preamble or pilot signal from a terminal;
    determining an allocation priority for a service of the terminal;
    selecting a packet;
    determining whether available resources exist;
    determining an antenna weight of each of the respective multiple antennas by using a channel response;
    predicting a received signal to interference and noise ratio (SINR) by using a channel response between the multiple antennas and the terminal and the channel quality information;
    calculating a weight of each of the multiple antennas by using a first method and allocating resources by using a non-SDMA method when the available resources exist;
    calculating the weight of the respective antennas by using a second method that is different from the first method and allocating resources by using an SDMA method when the available resources do not exist; and
    allocating resources to the terminal according to the received SINR.

2. The resource allocation method of claim 1, wherein the channel quality information includes a carrier to interference and noise ratio (CINR) and a received signal strength (RSS).

3. The resource allocation method of claim 1, wherein the resource is a downlink resource, and the received SINR is a downlink-received SINR.

4. The resource allocation method of claim 1, wherein the resource is an uplink resource, and the received SINR is an uplink-received SINR.

5. The resource allocation method of claim 1, further comprising receiving an estimation result of the channel response from the terminal.

6. The resource allocation method of claim 1, further comprising estimating the channel response by measuring a sounding signal received from the terminal.

7. The resource allocation method of claim 1, wherein the predicting of the received SINR comprises: determining a weight for each of the multiple antennas by using the channel response; and predicting the received SINR by using the weight and the channel quality information.

8. The resource allocation method of claim 1, wherein the allocating of the resources comprises performing a non-space division multiple access (non-SDMA) resource allocation process when available resources exist, and performing space division multiple access (SDMA) resource allocation when no available resource exists.

9. The resource allocation method of claim 8, wherein the same resource allocated to another terminal is not allocated to the terminal by the non-SDMA resource allocation process.

10. The resource allocation method of claim 9, wherein a plurality of resources that have been allocated are defined as a plurality of allocation bands, and at least one allocation band among the plurality of allocation bands is allocated to the terminal.

11. The resource allocation method of claim 1, wherein the resource is a downlink resource, the first method is a maximum ratio transmission (MRT) method, and the second method is a zero forcing (ZF) method.

12. The resource allocation method of claim 1, wherein the resource is an uplink resource, the first method is a maximum ratio combining (MRC) method, and the second method is a minimum mean square error (MMSE) method.

13. The resource allocation method of claim 1, wherein the allocating of the resources by using the non-SDMA method comprises;
selecting a resource to be allocated;
calculating a weight of each of the multiple antennas by using the first method;
selecting a modulation and coding scheme (MCS) level according to the received SINR and the weight; and
allocating a service packet of the terminal to the resource by using the selected MCS level and the weight;
wherein the selected MCS level has the highest data rate within a range in which required transmission energy in the resource to be allocated does not exceed the maximum transmission energy, and the required transmission energy is determined by the selected MCS level and the weight.

14. The resource allocation method of claim 13, wherein the maximum transmission energy is the maximum transmission energy of the terminal.

15. The resource allocation method of claim 13, wherein the maximum transmission energy is the maximum transmission energy of the base station.

16. The resource allocation method of claim 1, wherein the allocating of the resources by using the SDMA method comprises:
selecting a plurality of allocation bands from previously allocated resources; calculating an antenna weight of each of the multiple antennas by using the second method for the terminal and other terminals that have already been allocated to the respective allocation bands;
selecting an MCS level for the terminal in the respective allocation bands according to the received SINR and the antenna weight;
calculating an increased amount of data rate of the respective allocation bands according to the MCS level selected for each allocation band; and
selecting an allocation band having the largest increased amount of data rate among the plurality of allocation bands and allocating a service packet to the terminal,
wherein the MCS level selected for each allocation band is an MCS level having the highest data rate within a range in which a sum of required transmission power of the other terminal and required transmission power of the terminal does not exceed the maximum transmission power, and the required transmission energy of the terminal is determined by the selected MCS level and the antenna weight.

17. The resource allocation method of claim 16, wherein the maximum transmission energy is the maximum transmission energy of the terminal.

18. The resource allocation method of claim 16, wherein the maximum transmission energy is the maximum transmission energy of the base station.

19. A non-transitory recording medium of a base station using multiple antennas, the base station writing a program for realizing a downlink resource allocation method in the recording medium, wherein the downlink resource allocation method comprises:
receiving channel quality information estimated on the basis of downlink preamble or pilot signal from a terminal;
determining an allocation priority for a service of the terminal;
selecting a packet;
determining whether available resources exist;
determining an antenna weight of each of the respective multiple antennas by using a channel response between the respective multiple antennas and the terminal;
predicting a downlink received signal to interference and noise ratio (SINR) by using the antenna weight and the channel quality information;
calculating a weight of each of the multiple antennas by using a first method and allocating resources by using a non-space division multiple access (non-SDMA) method when the available resources exist;
calculating the weight of the respective antennas by using a second method that is different from the first method and allocating resources by using an SDMA method when the available resources do not exist; and
selecting a modulation and coding scheme (MCS) level according to the antenna weight and the received SINR and allocating downlink resources to the terminal.

20. The non-transitory recording medium of claim 19, wherein the determining of the antenna weight comprises determining the antenna weight by using a first method when an available downlink resource exists, and determining the antenna weight by using a second method that is different from the first method when no available downlink resource exists.

21. A non-transitory recording medium of a base station using multiple antennas, the base station writing a program for realizing an uplink resource allocation method in the recording medium, wherein the uplink resource allocation method comprises:
receiving channel quality information estimated on the basis of a downlink preamble or pilot signal from the terminal;
determining an allocation priority for a service of the terminal;
selecting a packet;
determining whether available resources exist;
determining an antenna weight of each of the respective multiple antennas by using a channel response between the respective multiple antennas and the terminal;
predicting an uplink received signal to interference and noise ratio (SINR) by using the antenna weight and the channel quality information;
calculating a weight of each of the multiple antennas by using a first method and allocating resources by using a non-space division multiple access (non-SDMA) method when the available resources exist;

calculating the weight of the respective antennas by using a second method that is different from the first method and allocating resources by using an SDMA method when the available resources do not exist; and selecting a modulation and coding scheme (MCS) level according to the antenna weight and the received SINR and allocating an uplink resource to the terminal.

22. The non-transitory recording medium of claim 21, wherein the determining of the antenna weight comprises determining the antenna weight by using a first method when an available uplink resource exists, and determining the antenna weight by using a second method that is different from the first method when no available uplink resource exists.

* * * * *